UNITED STATES PATENT OFFICE.

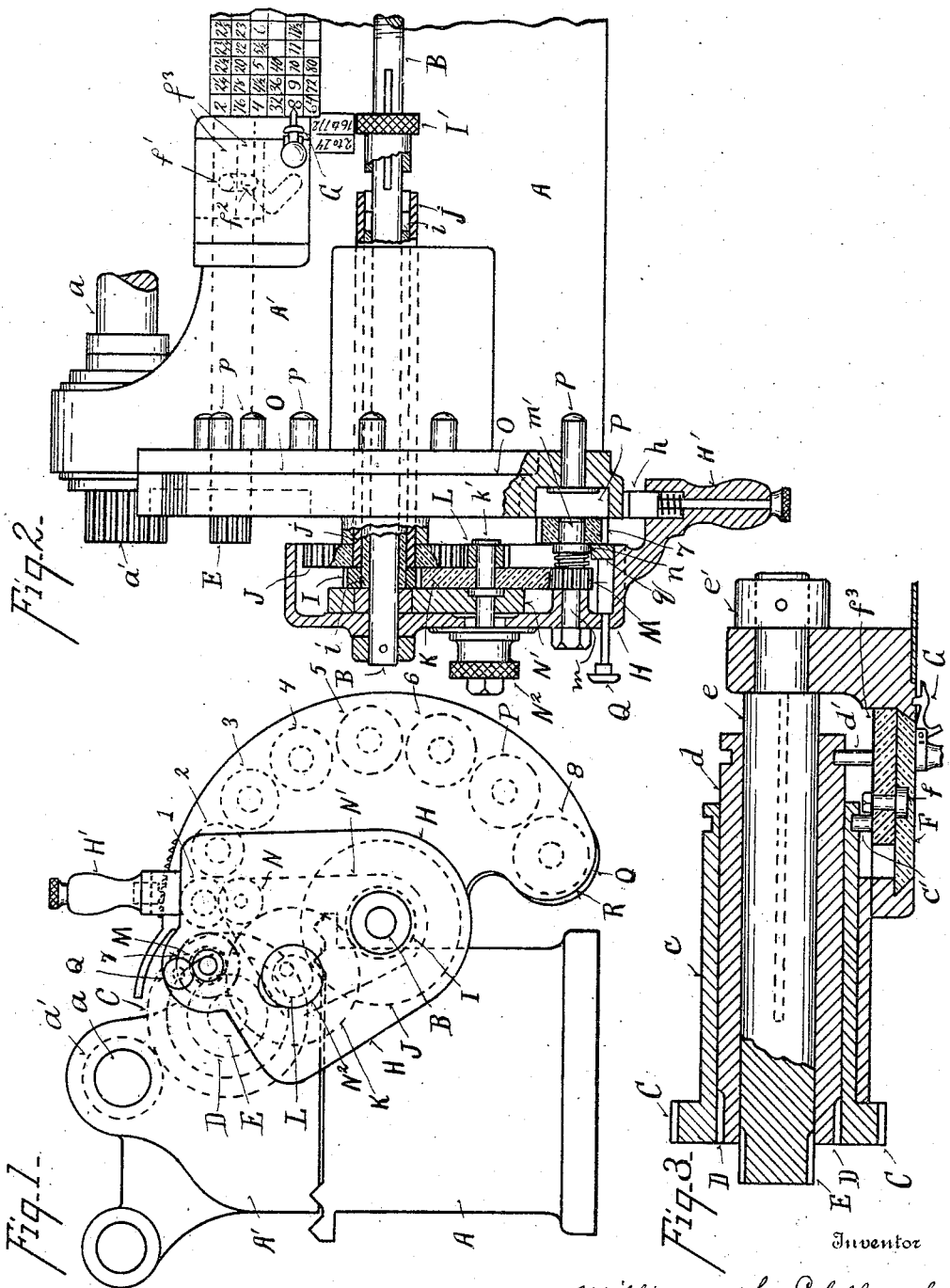

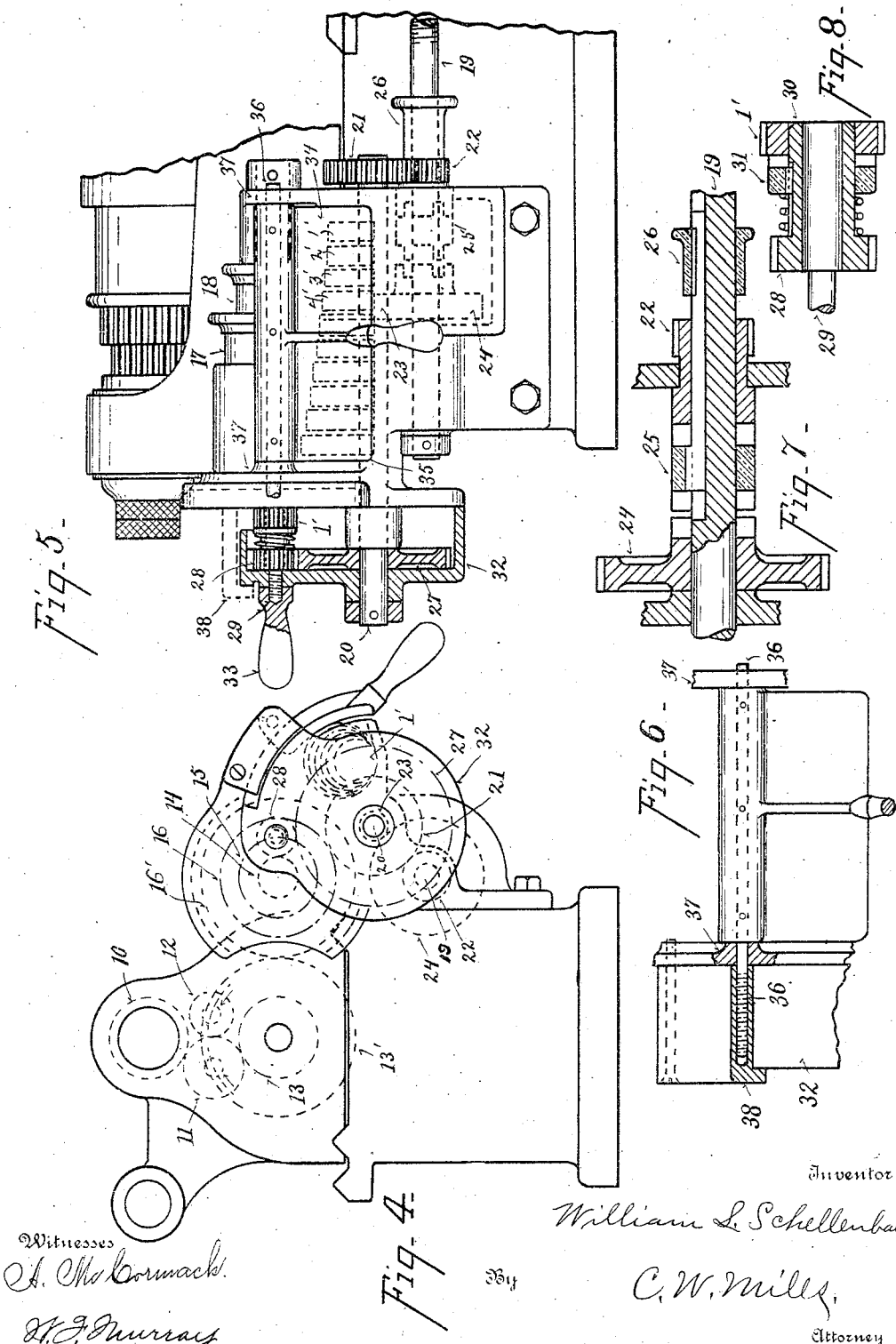

WILLIAM L. SCHELLENBACH, OF CINCINNATI, OHIO.

CHANGE-GEAR MECHANISM.

No. 844,541. Specification of Letters Patent. Patented Feb. 19, 1907.

Application filed February 16, 1905. Serial No. 245,815.

*To all whom it may concern:*

Be it known that I, WILLIAM L. SCHELLENBACH, a citizen of the United States, residing at Cincinnati, in the county of Hamilton and State of Ohio, have invented certain new and useful Improvements in Change-Gear Mechanism; and I do hereby declare the following to be a full, clear, and exact description of the invention, such as will enable others skilled in the art to which it appertains to make and use the same.

My invention relates to improvements in change-gear mechanism.

One of its objects is to provide an improved and more simple mechanism for changing the speed of the driven parts and applicable to engine-lathes and other tools.

Another object is to provide a mechanism having a greater range of speed changes than those heretofore in use.

Another object is to provide a mechanism in which the changes can be more readily and quickly effected.

It further consists in certain details of form, combination, and arrangement, all of which will be more fully set forth in the description of the accompanying drawings, in which—

Figure 1 is an end view of a lathe with my improved mechanism applied. Fig. 2 is a side elevation of the same, partly in section. Fig. 3 is a detailed section of the telescopic gears with their shifting mechanism. Fig. 4 and 5 are views similar to Figs. 1 and 2, showing a modification. Fig. 6 is a detail of the clutch on the lead-screw. Fig. 7 is a detail view of the planetary gear and clutch. Fig. 8 is a detail of the change-gear clutch.

Referring to Figs. 1, 2, and 3, A represents the main frame, A' the lathe head-stock, a the spindle, and B the lead-screw or driven element, by means of which the tool is driven. The spindle a carries a gear a', which meshes with and drives a gear C, carried by a sleeve c. Within sleeve c and splined thereto is a sleeve d, the forward end of which forms a gear D.

E represents a gear formed on the end of the spindle e, to which the sleeve d is splined. The spindle e is held against movement endwise by nut or collar e'. Gears C D are adapted to slide endwise on spindle e, so as to cover or uncover gear E as required, gear a' being long enough to preserve contact with gear C in whatever position. The sleeves c d and gears C D are shifted endwise by means of pins c' d' engaging annular grooves in the sleeves and being shifted by means of a slide F, mounted in ways in the head-stock and provided with a cam-groove f, in which are rollers f' f², which shift the blocks f³, which carry the pins c' d'. G represents a latch-lever to lock the slide F to the adjusted position and at the same time point out the class of thread which it is set to cut.

At the end of the lead-screw is mounted or journaled a housing H, which is provided with a handle H' and latch h, by means of which it may be adjusted and locked to varying positions. Within this housing are mounted on the lead-screw two gears I J upon sleeves i j, while the knurl I' is provided with clutch-teeth adapted to engage and lock either sleeve i or j to the lead-screw. Gears K L on shaft k' mesh with and drive gears I J, while the gear K in turn receives motion either directly from gear or pinion M on shaft m or indirectly therefrom through gear N, which with gear K is mounted on a plate N', which is adapted to be shifted relative to the housing, so as to bring either gear K or N into engagement with gear M to drive the lead-screw in forward or reverse direction. N² represents the eccentric or tumbler knurl, by which the plate is adjusted.

The gear M carries a sleeve m' and a spring-actuated clutch-plate n to receive any one of a series of change-gears 1 to 8, any one of which may be slipped on the sleeve m' or removed therefrom and replaced by another. These gears 1 to 8 are in line with and adapted to engage any one of the gears C D E, according to the position of said gears C D E relative to each other. In order that the gears 1 to 8 may be conveniently interchanged and may not be liable to loss or misplacement, I preferably provide a housing or casing O, attached to the head-stock, in which are a series of recesses P to receive the gears and a series of push-pins p, by means of which the gears may be pushed from the recesses onto the sleeve m'. In order to replace the gears in their recesses, the pin or stud Q is pressed, which forces the shoe q against the face of the gear and strips it from the sleeve m' into the recess opposite which the end of the sleeve has been brought. R represents an extension of the housing to prevent the gears 1 to 8 becoming dislodged from their recesses. The handle H' permits the housing being shifted to bring the sleeve m' opposite any desired change-gear and thence to a position to cause said gear to receive motion from one of the gears C D E, and thereby drive the lead-screw. The face of casing O prevents the detachment of the change-gear on the sleeve m', except to return it to its receptacle. Thus the change-gears are always locked in place and cannot become detached, lost, or misplaced, since it is necessary to return each change-gear to its compartment before another change-gear can be placed on the sleeve m', the plate R holding all except the gear to be used in their compartments.

In the modification, Figs. 4 to 6, driving-gear 10 is carried by the lathe-spindle and transmits motion through one or both gears 11 and 12 to gear 13 to drive it in forward or reverse direction. 14 15 16 represent telescopic or concentric gears similar to C D E of Figs. 1 and 2, which may be shifted by means of the cam-plate of Figs. 2 and 3 or by hand by means of knurls or knobs 17 18. The lead-screw or driven element 19 is driven from shaft 20 through gears 21 22 at high speed or through gears 23 24 at reduced speed—say at a ratio of eight to one. 25 represents a clutch shifted by knurl 26 to clutch either gear 22 or 24 to the lead-screw. A gear 27 on shaft 20 receives motion from a planetary gear 28 or one which can be adjusted concentrically about the gear 27 on stud-shaft 29, said gear 28 corresponding to gear M of Figs. 1 and 2. The sleeve 30 of gear 28, carrying a spring-clutch 31, is adapted to clutch the sleeve to any one of a series of change-gears 1' 2' 3' 4', said change-gears being designed to be readily slipped on or off the sleeve 30 by hand. The housing 32 serves as a support for stud-shaft 29 and is adapted to be moved by handle 33 to cause the change-gear in use to engage one or other of the telescopic gears 14 15 16, thereby completing the train of gearing between the spindle and lead-screw or driving and driven gears. The change-gears when not in use are housed in a recess 34 in the front of the head-stock, which recess is closed by a lid 35, which is keyed to a hinge or pivot rod 36, which journals in ears 37. One end of rod 36 is threaded into a clamp-plate 38, which engages and serves to lock the housing in place when the lid 35 is closed and to release the same when the lid is opened, which is effected by causing the screw-threaded end of rod 36 to draw up or tighten the clamp-plate when the lid closes and to unscrew to release it when the lid opens.

The above mechanism is simple, can be quickly operated to effect the changes, and gives a greatly-increased range of changes.

The mechanism herein disclosed is capable of considerable modification without departing from the principle of my invention.

Having described my invention, what I claim is—

1. In a device of the character indicated, a driving-gear, a series of concentric telescopic gears adapted to receive motion in common from the driving-gear, a driven gear, a housing a gear carried by said housing and in mesh with the driven gear, a series of gears adapted to be interchangeably employed to drive said gear carried by the housing, and means for telescopically shifting said concentric gears so as to selectively engage said change-gear with any one of the concentric gears.

2. In a device of the character indicated, a driving-gear, a pinion longitudinally confined, one or more telescopic gears arranged to slide on said pinion, one of which engages said driving-gear, means for adjusting said telescopic gears longitudinally into predetermined positions, a driven element receiving motion therefrom, a pinion adjustable concentrically about the axis of the driven element, means for changing the speed and reversing the motion of said driven element relative to said pinion, a series of independent change-gears held in the path described by the axis of said concentrically-adjustable pinion, and means for attaching any selected one of said independent gears to said concentrically-adjustable pinion.

3. In a device of the character indicated, a pinion longitudinally fixed, one or more telescopic gears arranged to rotate with and to slide upon said pinion, grooves provided in the hubs of said gears, shoes provided with pins and engaging said grooves, a cam engaging said pins and means for adjusting said gears longitudinally by the movement of said cam.

4. In a device of the character indicated, a driving-gear, a series of telescopic gears driven by said driving-gear, a driven gear, an adjustable pinion imparting motion to said driven gear, intermediate gearing between said driven gear and said adjustable pinion, a series of independent change-gears mounted in the path described by the axis of said adjustable pinion, means for attaching any selected one of said independent change-gears to said adjustable pinion, and means for meshing any selected one of said change-gears with any one of said telescopic gears.

5. In a device of the character indicated, a driving-gear a series of different-diameter gears driven by said driving-gear, an adjustable pinion, a change-gear adapted to be temporarily clutched to said pinion and to mesh with any one of said series of different-diameter gears, and a driven gear receiving motion from said adjustable pinion.

6. In a device of the character indicated, a driving-gear, a pinion, a pinion-shaft journaled and longitudinally fixed, a series of telescopic gears splined and arranged to slide on said pinion-shaft and meshing with said driving-gear, means for longitudinally adjusting said telescopic gears, a driven gear, a pinion imparting motion to said driven gear, a series of independent change-gears arranged to be selectively connected with said last-named pinion and to engage any one of said telescopic gears, a receptacle for said independent change-gears when not in use, and means for locking said change-gears in said receptacle while said telescopic gears and selected change-gear are intermeshed.

7. In a device of the character indicated, a driving-shaft, a series of concentric telescopic gears driven in common therefrom, a series of interchangeable gears adapted to selectively engage said concentric gears, and a cam-plate adapted by its movements to successively shift said concentric gears into the path of said change-gears.

8. In a device of the character indicated, a driving-gear a driven gear, a pinion adjustable concentrically about the driven gear and adapted to impart motion thereto, a clutch carried by said pinion, a series of change-gears adapted to be selectively engaged by said clutch, and while so engaged shifted into engagement with the driving-gear.

9. In a device of the character indicated, a driving-gear a driven gear, a pinion in mesh therewith, a stem projecting at one side of said pinion, a clutch carried on said stem, a series of change-gears adapted to interchangeably seat on said stem and engage said clutch, said change-gears being adapted to be shifted into and out of engagement with said driving-gear.

10. In a mechanism of the character indicated, a driving-gear, a driven element, a pinion mounted upon an adjustable axis and imparting motion to the driven element, a stem carried by said pinion, a clutch on said stem, a series of gears adapted to be interchangeably seated on said stem in engagement with said clutch, mechanism for shifting the interchangeable gear, temporarily in use, into and out of engagement with the driving-gear, and means interposed between said adjustable pinion and the driven element to change the speed of the driven element relative to said adjustable pinion.

11. In a device of the character indicated, a driving-gear, a series of telescopic gears driven by said driving-gear, a driven gear, a housing mounted concentric with said driven gear, a pinion carried by said housing and imparting motion to said driven gear, a clutch carried by said pinion, a series of independent change-gears arranged to be interchangeably mounted on said clutch, a plate opposite said clutch to hold said independent change-gears in engagement with said clutch, and means for selectively engaging any one of said independent change-gears with any one of the series of telescopic gears.

12. In a device of the character indicated, a driving-gear, a driven gear, a pinion concentrically adjustable about one of said before-mentioned gears, a clutch carried by said concentrically-adjustable pinion, a series of change-gears adapted to be selectively attached to said clutch and adjusted into position to transmit motion from the driving to the driven gear through said pinion, a receptacle to receive such change-gears when not in use, and means for automatically locking said change-gears in the receptacle when the gears are adjusted to transmit motion from the driving to the driven gear.

In testimony whereof I have affixed my signature in presence of two witnesses.

WILLIAM L. SCHELLENBACH.

Witnesses:
ADAH DENIS,
C. W. MILES.